United States Patent
Jin et al.

(10) Patent No.: US 11,463,947 B2
(45) Date of Patent: Oct. 4, 2022

(54) COMMUNICATION METHOD, ACCESS NETWORK DEVICE, AND TERMINAL DEVICE TO FACILITATE COMMUNICATION IN A NETWORK SLICE ARCHITECTURE

(71) Applicant: HUAWEI TECHNOLOGIES CO., LTD., Guangdong (CN)

(72) Inventors: Yinghao Jin, Shanghai (CN); Feng Han, Shanghai (CN); Wei Tan, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/926,136

(22) Filed: Jul. 10, 2020

(65) Prior Publication Data
US 2020/0344679 A1    Oct. 29, 2020

Related U.S. Application Data

(63) Continuation of application No. PCT/CN2019/071333, filed on Jan. 11, 2019.

(30) Foreign Application Priority Data

Jan. 12, 2018 (CN) .......................... 201810032707.9

(51) Int. Cl.
*H04W 48/18* (2009.01)
*H04W 76/12* (2018.01)
(Continued)

(52) U.S. Cl.
CPC .......... *H04W 48/18* (2013.01); *H04L 69/322* (2013.01); *H04W 36/0011* (2013.01);
(Continued)

(58) Field of Classification Search
CPC . H04W 48/18; H04W 72/0426; H04W 36/00; H04W 36/0055; H04W 36/14;
(Continued)

(56) References Cited

U.S. PATENT DOCUMENTS

2017/0332226 A1    11/2017  Bharatia
2018/0332523 A1*   11/2018  Faccin ................. H04W 36/14
(Continued)

FOREIGN PATENT DOCUMENTS

CN          106375987 A     2/2017
CN          106851589 A     6/2017
(Continued)

OTHER PUBLICATIONS

Extended European Search Report issued in European Application No. 19738323.5 dated Nov. 11, 2020, 21 pages.
(Continued)

*Primary Examiner* — Ricardo H Castaneyra
(74) *Attorney, Agent, or Firm* — Fish & Richardson P.C.

(57) ABSTRACT

This application provides a communication method, an access network device, and a terminal device. The communication method includes obtaining, by a first access network device, information about a correspondence between a session of a terminal device and a network slice; and sending, by the first access network device, the information to a second access network device.

11 Claims, 7 Drawing Sheets

(51) Int. Cl.
  *H04W 76/16* (2018.01)
  *H04L 69/322* (2022.01)
  *H04W 36/00* (2009.01)
  *H04W 36/14* (2009.01)

(52) U.S. Cl.
  CPC ....... *H04W 36/0066* (2013.01); *H04W 36/14* (2013.01); *H04W 76/12* (2018.02); *H04W 76/16* (2018.02)

(58) Field of Classification Search
  CPC ......... H04W 36/0066; H04W 36/0011; H04W 76/16; H04W 76/12; H04L 69/322
  See application file for complete search history.

(56) References Cited

U.S. PATENT DOCUMENTS

| | | | | |
|---|---|---|---|---|
| 2018/0368140 | A1* | 12/2018 | Centonza | H04W 72/0426 |
| 2019/0020996 | A1* | 1/2019 | Zhang | H04W 8/12 |
| 2019/0045351 | A1* | 2/2019 | Zee | H04W 48/18 |
| 2019/0166644 | A1* | 5/2019 | Shaw | H04L 41/12 |
| 2020/0154320 | A1* | 5/2020 | Xu | H04W 36/08 |

FOREIGN PATENT DOCUMENTS

| | | |
|---|---|---|
| CN | 106982410 A | 7/2017 |
| CN | 107277883 A | 10/2017 |
| EP | 3576457 A1 | 12/2019 |
| WO | 2017118489 A1 | 7/2017 |
| WO | 2017135860 A1 | 8/2017 |

OTHER PUBLICATIONS

Huawei, "Further Discussion on Slice Re-mapping," 3GPP TSG-RAN WG3 95bis, R3-171251, Spokane, Washington, USA, Apr. 3-7, 2017, 7 pages.

ZTE, "NW Slice Availability Handling Approaches during Mobility," 3GPP TSG RAN WG3 Meeting #95bis, R3-171029, Spokane, USA, Apr. 3-7, 2017, 6 pages.

Motorola Mobility et al.,"23.502: UE Traffic Routing",SA WG2 Meeting #119,S2-170859, Dubrovnik, Croatia, Feb. 13-17, 2017, 6 pages.

Ericsson, "Slice and AMF selection at HO procedure",SA WG2 Meeting #124,S2-178552, Reno, Nevada, USA, Nov. 27-Dec. 1, 2017, 24 pages.

Ericsson, "Slice and AMF selection at HO procedure",SA WG2 Meeting #124,S2-178551, Reno, Nevada, USA, Nov. 27-Dec. 1, 2017, 6 pages.

Office Action issued in Chinese Application No. 201810032707.9 dated Dec. 18, 2019, 14 pages (with English Translation).

Office Action issued in Chinese Application No. 201810032707.9 dated May 26, 2020, 16 pages (with English Translation).

PCT International Search Report and Written Opinion in International Application No. PCT/CN2019/071,333, dated Mar. 29, 2019, 17 pages (with English Translation).

* cited by examiner

1

COMMUNICATION METHOD, ACCESS NETWORK DEVICE, AND TERMINAL DEVICE TO FACILITATE COMMUNICATION IN A NETWORK SLICE ARCHITECTURE

CROSS-REFERENCE TO RELATED APPLICATIONS

This application is a continuation of International Application No. PCT/CN2019/071333, filed on Jan. 11, 2019, which claims priority to Chinese Patent Application No. 201810032707.9, filed on Jan. 12, 2018. The disclosures of the aforementioned applications are hereby incorporated by reference in their entireties.

TECHNICAL FIELD

This application relates to the communications field, and more specifically, to a communication method, an access network device, and a terminal device.

BACKGROUND

A network slicing technology is a key technology of 5G, and aims to provide services for different tenants and differentiated services by using customized networks. However, due to network slice deployment, network slices supported by different cells or different base stations are different. For example, some cells or base stations do not support a network slice, or even if a function of the network slice is supported, the some cells or base stations do not support a feature of the network slice due to operator deployment or an operator policy.

SUMMARY

This application provides a communication method, an access network device, and a terminal device, to ensure communication in a network slice architecture.

According to a first aspect, a communication method is provided. The communication method includes: obtaining, by a first access network device, information about a correspondence from a terminal device, where the correspondence includes a correspondence between a session of the terminal device and a network slice; and sending, by the first access network device, the information about the correspondence to a second access network device.

In this embodiment of this application, the first access network device obtains the correspondence between a session of the terminal device and a network slice, and sends the correspondence to the second access network device, so that the second access network device can properly configure the corresponding session based on the correspondence, and therefore, communication between the terminal device and the second access network device is ensured.

In a possible implementation, the session includes a first session, the network slice includes a first network slice, and the first session corresponds to the first network slice; and the correspondence includes a first relationship, and the first relationship includes a correspondence between the first session and the first network slice.

In this embodiment of this application, the second access network device may properly configure the first session based on the first relationship, to ensure the communication between the terminal device and the second access network device.

In a possible implementation, the network slice further includes a second network slice, and the correspondence further includes information about a second relationship between the first session and the second network slice. In this embodiment of this application, when the second access network device does not support the first network slice corresponding to the first session, the second access network device may determine, for the first session based on the second relationship, the second network slice to provide a service for the first session, to ensure the communication between the terminal device and the second access network device.

In a possible implementation, the network slice further includes a third network slice, and the first relationship further includes a correspondence between the first session and the third network slice.

In this embodiment of this application, the first relationship may include a correspondence between the first session and a plurality of network slices, so that the second access network device may determine, from the plurality of network slices based on the first relationship, one network slice to properly configure the first session, and the communication between the terminal device and the second access network device is further ensured.

In a possible implementation, the obtaining, by a first access network device, information about a correspondence from a terminal device includes: receiving, by the first access network device, the information about the correspondence that is sent by a core network device, where the information about the correspondence is obtained by the core network device from the terminal device.

In a possible implementation, the obtaining, by a first access network device, information about a correspondence from a terminal device includes: sending, by the first access network device, instruction information to the terminal device, where the instruction information is used to instruct the terminal device to send the correspondence to the first access network device; and receiving, by the first access network device, the information about the correspondence that is sent by the terminal device.

In a possible implementation, the instruction information is further used to instruct the terminal device to send, when a preset first condition is met, the correspondence to the first access network device.

In this embodiment of this application, a resource waste can be avoided by instructing to send the correspondence under the preset first condition.

In a possible implementation, the instruction information is carried in radio resource control RRC signaling.

According to a second aspect, a communication method is provided. The communication method includes: obtaining, by a terminal device, information about a correspondence, where the correspondence includes a correspondence between a session of the terminal device and a network slice; and sending, by the terminal device, the information about the correspondence to a first access network device.

In this embodiment of this application, the terminal device sends the correspondence between a session and a network slice to the first access network device, so that the first access network device may determine the network slice corresponding to the session.

The session includes a first session, the network slice includes a first network slice, and the first session corresponds to the first network slice; and the correspondence includes a first relationship, and the first relationship includes a correspondence between the first session and the first network slice.

In a possible implementation, the network slice further includes a second network slice, and the correspondence further includes information about a second relationship between the first session and the second network slice.

In a possible implementation, the network slice includes a third network slice, and the first relationship further includes a correspondence between the first session and the third network slice.

In a possible implementation, the obtaining, by a terminal device, information about a correspondence includes: determining, by the terminal device, the correspondence based on a network slice selection policy NSSP.

In a possible implementation, the obtaining, by a terminal device, information about a correspondence includes: receiving, by the terminal device, instruction information sent by the first access network device, where the instruction information is used to instruct the terminal device to send the correspondence to the first access network device; and sending, by the terminal device, the information about the correspondence to the first access network device. In a possible implementation, the instruction information is carried in radio resource control RRC signaling.

In a possible implementation, the instruction information is further used to instruct the terminal device to send, when a preset first condition is met, the correspondence to the first access network device.

According to a third aspect, a communication method is provided. The communication method includes: receiving, by a second access network device, a first message sent by a first access network device, where the first message includes information about a correspondence, and the correspondence includes a correspondence between a session of a terminal device and a network slice; and sending, by the second access network device, a response message, where the response message is a response to the first message.

In this embodiment of this application, the second access network device may properly configure the corresponding session based on the received correspondence between a session and a network slice, and therefore, communication between the second access network device and the terminal device is ensured.

In a possible implementation, the session includes a first session, the network slice includes a first network slice, and the first session corresponds to the first network slice; and the correspondence includes a first relationship, and the first relationship includes a correspondence between the first session and the first network slice.

In a possible implementation, the network slice further includes a second network slice, and the correspondence further includes information about a second relationship between the first session and the second network slice; and when the second access network device cannot provide a service for the first session by using the first network slice, the second access network device serves the first session by using the second network slice.

In this embodiment of this application, when the first network slice cannot be used to provide the service for the first session, the second access network device may serve, based on the second relationship, the first session by using the second network slice, and therefore, the communication between the terminal device and the second access network device is ensured.

In a possible implementation, the network slice further includes a third network slice, and the first relationship further includes a correspondence between the first session and the third network slice.

According to a fourth aspect, a communication method is provided. The communication method includes: receiving, by a core network device, information about a correspondence that is sent by a first access network device, where the correspondence includes a correspondence between a session of a terminal device and a network slice; and determining, by the core network device based on the information about the correspondence, a network slice for one or more sessions in sessions of the terminal device; or sending, by the core network device, the information about the correspondence to a second access network device.

In a possible implementation, the session includes a first session, the network slice includes a first network slice, and the first session corresponds to the first network slice; and the correspondence includes a first relationship, and the first relationship includes a correspondence between the first session and the first network slice.

In a possible implementation, the network slice further includes a second network slice, and the correspondence further includes information about a second relationship between the first session and the second network slice.

In a possible implementation, the network slice includes a third network slice, and the first relationship further includes a correspondence between the first session and the third network slice.

According to a fifth aspect, a communication method is provided. The communication method includes: receiving, by a terminal device, information about a correspondence that is sent by a first access network device, where the correspondence includes a correspondence between a session of the terminal device and a network slice; and sending, by the terminal device, request message to a second access network device, where the request message is used to request to establish a connection between the second access network device and the terminal device, and the second access network device is determined based on the correspondence.

In this embodiment of this application, the terminal device may select a proper second access network device based on the received correspondence between a session and a network slice, to ensure that the terminal device may communicate with the second access network device.

In a possible implementation, the session includes at least one first session, the first session currently corresponds to a first network slice, the terminal device receives remapping policy information sent by the first access network device, and the remapping policy information is used to instruct to remap the first session from the first network slice to at least one second network slice; and that the second access network device is determined based on the correspondence includes: the second access network device is determined based on the correspondence and the remapping policy information.

In a possible implementation, the session includes at least one first session, the first session corresponds to a first network slice, the terminal device receives remapping policy information sent by a core network device, and the remapping policy information is used to instruct to remap the first session from the first network slice to at least one second network slice; and that the second access network device is determined based on the correspondence includes: the second access network device is determined based on the correspondence and the remapping policy information.

According to a sixth aspect, a communication method is provided. The communication method includes: sending, by a first access network device, information about a correspondence to a terminal device, where the correspondence includes a correspondence between a session of the terminal device and a network slice; and sending, by the terminal device, request message to a second access network device, where the request message is used to request to establish a connection between the second access network device and the terminal device, and the second access network device is determined based on the correspondence.

In a possible implementation, the session includes at least one first session, the first session currently corresponds to a first network slice, the first access network device sends remapping policy information to the terminal device, and the remapping policy information is used to instruct to remap the first session from the first network slice to at least one second network slice.

According to a seventh aspect, a communication method is provided. The communication method includes: sending, by a core network device, remapping policy information to a terminal device, where the remapping policy information is used to instruct to remap at least one session corresponding to the terminal device from a currently corresponding first network slice to at least one second network slice, and the remapping policy information is further used to determine a second access network device when the terminal device performs cell reselection.

According to an eighth aspect, an access network device is provided. The access network device has functions of implementing the access network device in the method embodiment of the first aspect. These functions may be implemented by hardware, or may be implemented by hardware executing corresponding software. The hardware or software includes one or more units corresponding to the foregoing functions.

According to a ninth aspect, this application provides a terminal device. The terminal device has functions of implementing the terminal device in the foregoing method embodiments. These functions may be implemented by hardware, or may be implemented by hardware executing corresponding software. The hardware or software includes one or more units corresponding to the foregoing functions.

According to a tenth aspect, this application provides an access network device. The access network device has functions of implementing the access network device in the method embodiment in the method design of the third aspect. These functions may be implemented by hardware, or may be implemented by hardware executing corresponding software. The hardware or software includes one or more units corresponding to the foregoing functions.

According to an eleventh aspect, this application provides a communications apparatus. The communications apparatus includes: the communications apparatus may be the first access network device in the foregoing method designs, or may be a chip disposed in the first access network device. The communications apparatus includes: a memory, configured to store computer executable program code; a communications interface; and a processor, where the processor is coupled to the memory and the communications interface. The program code stored in the memory includes an instruction, and when the processor executes the instruction, the communications apparatus is enabled to perform the methods performed by the first access network device in the method embodiments of the first aspect to the fourth aspect.

According to a twelfth aspect, this application provides a communications apparatus. The communications apparatus includes: the communications apparatus may be the terminal device in the foregoing method designs, or may be a chip disposed in the terminal device. The communications apparatus includes: a memory, configured to store computer executable program code; a communications interface; and a processor, where the processor is coupled to the memory and the communications interface. The program code stored in the memory includes an instruction, and when the processor executes the instruction, the communications apparatus is enabled to perform the methods performed by the terminal device in the method embodiments of the first aspect to the fourth aspect.

According to a thirteenth aspect, this application provides a communications apparatus. The communications apparatus includes: the communications apparatus may be the second access network device in the foregoing method designs, or may be a chip disposed in the first access network device. The communications apparatus includes: a memory, configured to store computer executable program code; a communications interface; and a processor, where the processor is coupled to the memory and the communications interface. The program code stored in the memory includes an instruction, and when the processor executes the instruction, the communications apparatus is enabled to perform the methods performed by the second access network device in the method embodiments of the first aspect to the fourth aspect.

According to a fourteenth aspect, this application provides a communications apparatus. The communications apparatus includes: the communications apparatus may be the first access network device in the foregoing method designs, or may be a chip disposed in the first access network device. The communications apparatus includes: a memory, configured to store computer executable program code; a communications interface; and a processor, where the processor is coupled to the memory and the communications interface. The program code stored in the memory includes an instruction, and when the processor executes the instruction, the communications apparatus is enabled to perform the methods performed by the first access network device in the method embodiments of the fifth aspect to the seventh aspect.

According to a fifteenth aspect, this application provides a communications apparatus. The communications apparatus includes: the communications apparatus may be the terminal device in the foregoing method designs, or may be a chip disposed in the terminal device. The communications apparatus includes: a memory, configured to store computer executable program code; a communications interface; and a processor, where the processor is coupled to the memory and the communications interface. The program code stored in the memory includes an instruction, and when the processor executes the instruction, the communications apparatus is enabled to perform the methods performed by the terminal device in the method embodiments of the fifth aspect to the seventh aspect.

According to a sixteenth aspect, this application provides a communications apparatus. The communications apparatus includes: the communications apparatus may be the second access network device in the foregoing method designs, or may be a chip disposed in the first access network device. The communications apparatus includes: a memory, configured to store computer executable program code; a communications interface; and a processor, where the processor is coupled to the memory and the communications interface. The program code stored in the memory includes an instruction, and when the processor executes the instruction, the communications apparatus is enabled to perform the methods performed by the second access network device in the method embodiments of the fifth aspect to the seventh aspect.

According to a seventeenth aspect, this application provides a computer program product. The computer program product includes computer program code, and when the computer program code is run on a computer, the computer is enabled to perform the methods in the foregoing aspects.

According to an eighteenth aspect, a computer-readable medium is provided. The computer-readable medium stores program code, and when the computer program code is run on a computer, the computer is enabled to perform the methods in the foregoing aspects.

According to a nineteenth aspect, this application provides a chip system. The chip system includes a processor, configured to support an access network device in implementing a function in the foregoing aspects, for example, receiving or processing the information in the foregoing methods. In a possible design, the chip system further includes a memory, and the memory is configured to store a program instruction and data that are necessary for the access network device. The chip system may include a chip, or may include a chip and another discrete component.

According to a twentieth aspect, this application provides a chip system. The chip system includes a processor, configured to support a terminal device in implementing a function in the foregoing aspects, for example, sending or processing the information in the foregoing methods. In a possible design, the chip system further includes a memory, and the memory is configured to store a program instruction and data that are necessary for the terminal device. The chip system may include a chip, or may include a chip and another discrete component.

DESCRIPTION OF EMBODIMENTS

Figure 1:
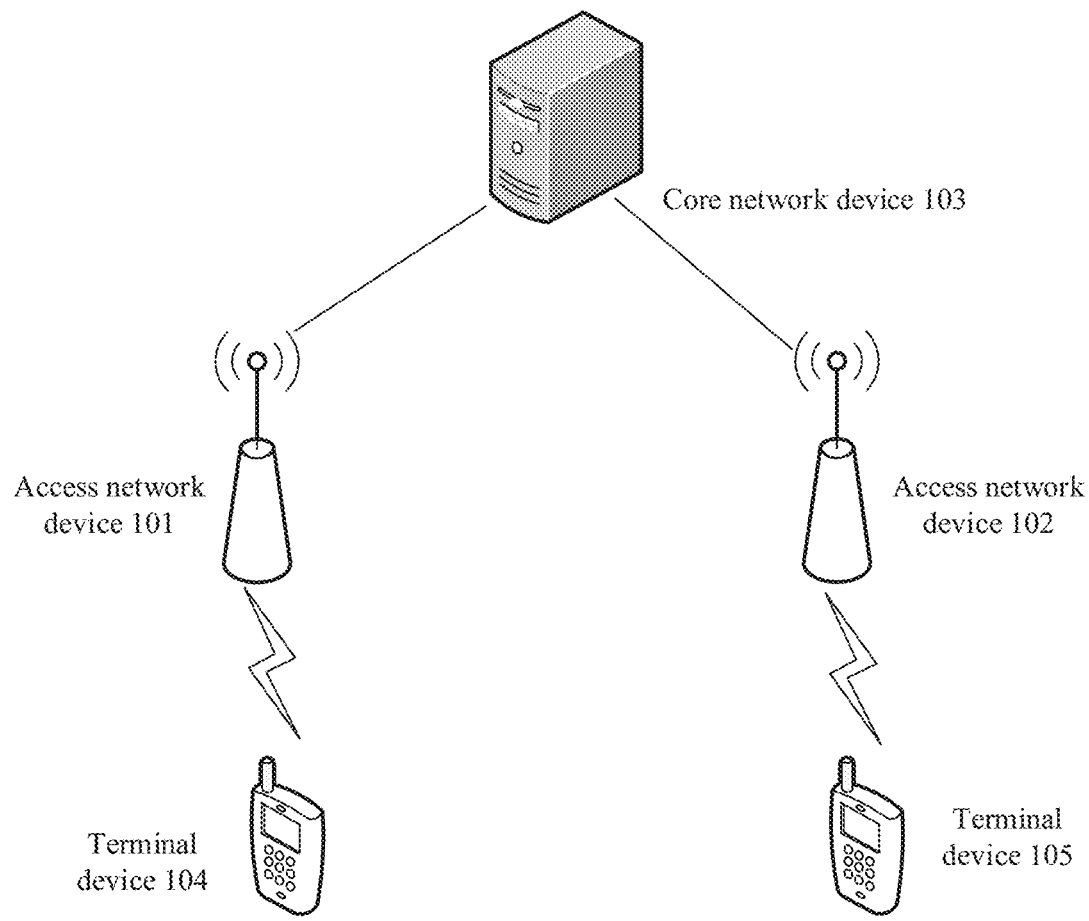
FIG. 1 is a schematic diagram of a network architecture according to an embodiment of this application.

The following describes technical solutions of this application with reference to accompanying drawings.

The technical solutions of embodiments of this application may be applied to various communications systems, such as: a global system for mobile communications (Global System of Mobile Communication, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunication system (Universal Mobile Telecommunication System, UMTS), a worldwide interoperability for microwave access (Worldwide Interoperability for Microwave Access, WiMAX) communications system, a future 5th generation (5th Generation, 5G) system, and a new radio (New Radio, NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may alternatively be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (Public Land Mobile Network, PLMN). This is not limited in the embodiments of this application.

An access network device in the embodiments of this application may be a device configured to communicate with the terminal device, and the access network device may be a radio access network (Radio Access Network, RAN) device. The RAN device may include various types of base stations. For example, the base station in the embodiments of this application may include macro base stations, micro base stations, relay stations, access points, and the like in various forms. In systems using different radio access technologies, names of devices that have base station functions may be different. For example, in an LTE network, a device that has a base station function is referred to as an evolved NodeB (evolved NodeB, eNB or eNodeB). In a 3rd generation (3rd Generation, 3G) network, a device that has a base station function is referred to as a NodeB (NodeB) or the like. In a 5th generation (5th generation, 5G) network, a device that has a base station function may be referred to as a gNodeB (gNodeB, gNB) or the like. This is not limited in the embodiments of this application.

A core network (Core Network, CN) device in the embodiments of this application may be a control plane anchor of the terminal device, and provides a function such as registration area (registration area) update for the terminal. For example, the core network device may include an access and mobility management function (Access and Mobility Management Function, core network device). The core network device may be a network device configured to provide functions such as core network access (Core access) and mobility management for the terminal. A specific function of the core network device may be similar to a function of a mobility management entity (Mobility Management Entity, MME) in the LTE system.

Before a communication method, the access network device, and the terminal device in this application are described, for ease of understanding content of this application, some terms used in the embodiments of this application are first described.

Network slice (Network slice): Network slices are logical networks having different network capabilities and network features that are customized on a physical or virtual network infrastructure based on different service requirements, tenants, or the like. A network slice may be a complete end-to-end network including a terminal device, an access network, a transmission network, a core network, and an application server, can provide a telecommunications service, and has a specific network capability. Alternatively, the network slice may be any combination of the terminal device, the access network, the transmission network, the core network, and the application server. For example, the network slice includes only the access network and the core network. The network slice may have one or more of the following features: The access network may support the network slice, or may not support the network slice; the access network may be shared by a plurality of network slices; and features of different network slices and network function modules separately included in the different network slices may be different.

A network slice identifier may include but is not limited to at least one of the following: network slice type information, service type information, tenant (Tenant) information, user group information, slice group information, network slice instance information, a dedicated core network (Dedicated Core Network, DCN) identifier, single network slice selection assistance information (Single Network Slice Selection Assistance information, S-NSSAI), S-NSSAI group information, a temporary identifier (Temporary ID), and R-NSSAI (RAN-NSSAI).

Specific definitions of the foregoing terms are as follows:

Network slice type information: For example, the network slice type information may indicate network slice types such as enhanced mobile broadband (enhanced Mobile BroadBand, eMBB), ultra-reliable low-latency communication (Ultra-Reliable Low-Latency Communication, URLLC), or massive machine type communication (massive Machine Type Communication, mMTC). Optionally, the network slice type information may alternatively indicate an end-to-end network slice type, including a RAN-to-CN network slice type, or may indicate a RAN-side network slice type, or a CN-side network slice type.

Service type information: Identification information related to a specific service. For example, the service type information may indicate a service feature or specific service information of a service such as a video service, an internet of vehicles service, or a voice service.

Tenant information: The tenant information is used to indicate information about a customer that creates or rents the network slice, for example, Tencent or the State Grid Corporation of China.

User group information: The user group information is used to indicate information about a group of users that are grouped based on a specific feature such as a user level.

Slice group information: The slice group information is used to indicate information about a slice group grouped based on a specific feature. For example, all network slices that can be accessed by the terminal device may be classified as one slice group, or network slices may be grouped based on another standard.

Network slice instance information: The network slice instance information is used to indicate an identifier and feature information of an instance created for the network slice. For example, an identifier may be allocated to a network slice instance, to indicate the network slice instance. Alternatively, a new identifier may be mapped based on the network slice instance identifier, the new identifier is associated with the network slice instance, and a receiver may identify, based on the identifier, the specific network slice instance indicated by the identifier.

Dedicated core network identifier: The identifier is used to uniquely identify a dedicated core network in an LTE, an eLTE, or a 5G system, for example, a dedicated core network of the internet of things. Optionally, the dedicated core network identifier may perform mapping with the network slice identifier, the network slice identifier may be obtained by mapping the dedicated core network identifier, and the dedicated core network identifier may also be obtained by mapping the network slice identifier.

S-NSSAI: The S-NSSAI may include at least slice/service type (Slice/Service type, SST) information, and optionally, may further include slice differentiator (Slice Differentiator, SD) information. The SST information, such as a feature and a service type of the network slice, is used to indicate behavior of the network slice. The SD information is supplemental information of the SST information. If the SST information is used by a plurality of network slice instances, the SD information may correspond to one unique network slice instance.

S-NSSAI group information: The S-NSSAI group information is used to indicate identification information of an S-NSSAI group grouped based on a specific feature. For example, all network slices of a common core network device that can be accessed by the terminal device may be grouped into one S-NSSAI group.

Temporary identifier: The temporary identifier is allocated by the core network device to a terminal that is already registered on a CN side, and the temporary identifier may uniquely point to a specific core network device.

R-NSSAI (RAN-NSSAI): The R-NSSAI indicates a group of specific pieces of S-NSSAI, namely, an identifier of a set of a group of specific pieces of S-NSSAI.

It should be understood that, in the embodiments of this application, the network slice may use at least one of the foregoing parameters to represent network slice indication information of the network slice. For example, the network slice indication information of the network slice may be represented by using the network slice type, or may be represented by using the network slice type and the service type, or may be represented by using the service type and the tenant information. This is not limited in the embodiments of this application. How to represent the network slice indication information of the network slice is not described in detail in the following. Optionally, a specific coding form of the network slice indication information of the network slice is not limited. Different fields, of an interface message that can be carried between different devices, may separately represent different network slice indication information. Alternatively, abstracted index values may be used for replacement, and different index values separately correspond to different network slices. Certainly, in addition to the foregoing identifiers, another identifier may be further used. This is not limited herein. It should be understood that if the terminal/access network device/core network device supports a plurality of network slices, information about the network slices supported by the terminal/access network device/core network device may be represented in a form of listing at least one of the foregoing identifiers.

First, for ease of understanding, the following briefly describes an application environment of the embodiments of this application with reference to FIG. 1. As shown in FIG. 1, the application environment includes an access network device 101, an access network device 102, a core network device 103, a terminal device 104, and a terminal device 105. The access network device may be connected to at least one terminal device. For example, the access network device 101 is connected to the terminal device 104, and the access network device 102 is connected to the terminal device 105. The access network device may be connected to at least one core network device. For example, the access network device 101 and the access network device 102 are separately connected to the core network device 103.

There is an interface, for example, an NG interface, between the core network device and the access network device. Through the interface, the core network device and the access network device may communicate with each other. There is not necessarily a communications interface between access network devices. If there is a communications interface, for example, an Xn interface, between the access network device 101 and the access network device 102, the access network device 101 and the access network device 102 may communicate with each other. If there is no communications interface between the access network device 101 and the access network device 102, the access network device 101 and the access network device 102 cannot communicate with each other. Therefore, the access network device 101 and the access network device 102 can transmit, only when there is a communications interface, information about network slices separately supported by the access network device 101 and the access network device 102. When there is no communications interface, the access network device 101 and the access network device 102 cannot communicate with each other, and cannot send the information about the network slices separately supported by the access network device 101 and the access network device 102. In this case, the access network device 101 and the access network device 102 may interact with each other by using the core network device as a relay.

There may be a plurality of types of services in the terminal device, for example, an enhanced mobile broadband (enhanced mobile broadband, eMBB) service, an ultra-reliable low-latency communication (ultra-reliable low-latency communication, URLLC) service, and a massive machine type communication (massive machine type communication, mMTC) service. Network slices corresponding to different types of service sessions may be different. For example, the terminal device 104 is used as an example. Three sessions currently established by the access network device 101 for the terminal device 104 are a session 1, a session 2, and a session 3, the session 1 corresponds to a network slice 1, the session 2 corresponds to a network slice 2, and the session 3 corresponds to a network slice 3. Because provided operators or service providers are different, even service sessions of a same service type may also correspond to different network slices.

It should be noted that the session may be a packet data unit (packet data unit, PDU) session, or may be an internet protocol (internet protocol, IP) session. The PDU session may be a connection established between the terminal device and a data network, and the connection between the terminal device and the data network may be an internet protocol (internet protocol, IP)-based connection, an ethernet-based connection, or another type of connection. In this embodiment of this application, the method or the apparatus in this application is described by using an example in which the session is a PDU session.

Figure 2:
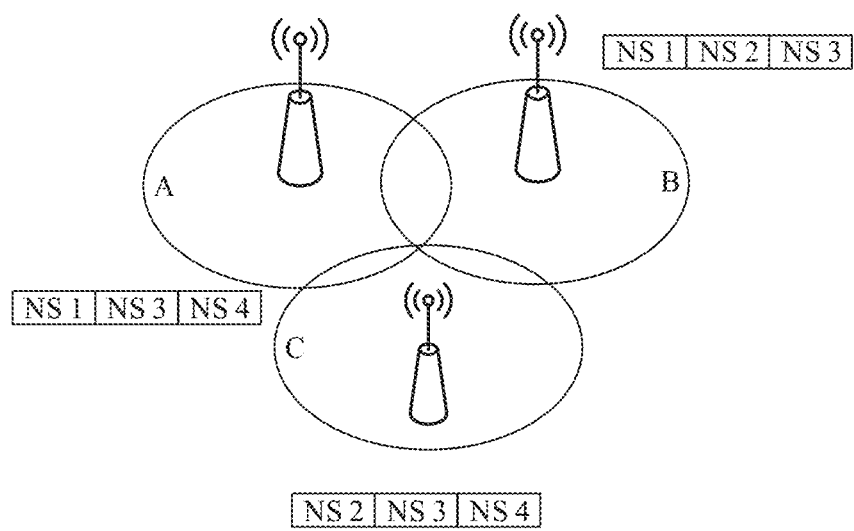
FIG. 2 is a schematic diagram in which different cells support different network slices.

In addition, because of network slice deployment, network slices supported by different access network devices are different. As shown in FIG. 2, a cell A supports network slices (Network Slice, NS) 1, 3, and 4, a cell B supports network slices 1, 2, and 3, and a cell C supports network slices 2, 3, and 4. Based on the foregoing example, there is another case in which some cells or base stations do not support a network slice. In other words, the cells or base stations are similar to conventional LTE base stations or 3G base stations, and do not support a feature of the network slice, or even if a function of the network slice is supported, due to operator deployment or an operator policy, the cells or base stations do not support the network slice.

A terminal device in a connected state may move from an access network device that does not support a network slice to an access network device that supports a network slice. In other words, a source access network device does not support a network slice, but a target access network device supports a network slice. For example, with reference to FIG. 1, the terminal device 104 is used as an example. A radio resource in the access network device 101 is limited, and the access network device 101 does not support a network slice corresponding to a session of the terminal device 104; or the access network device 101 does not support a feature of the network slice; or because of mobility of the terminal, the terminal device 104 needs to be handed over from the access network device 101 to the access network device 102, and the access network device 102 supports the network slice. In this scenario, after the terminal device 104 is handed over from the access network device 101 to the access network device 102, what network slice is used by the access network device 102 to serve the session of the terminal device 104 is a problem worth studying.

For sessions handed over from the source access network device to the target access network device, the target access network device sends, to the core network device in a path transfer request, a session identifier corresponding to a session that can be received, and then the core network device determines a network slice that serves the session, and notifies the target access network device by using a path request reply message.

Different network slices may use different configurations. When determining to receive the user session, the target access network device may not determine a network slice for the received session, and consequently, a configuration error may be caused and a transmission problem is caused. For example, an incorrect configuration causes a problem such as transmission interruption, or that quality of service (quality of service, QoS) performance cannot be ensured. In addition, after the configuration error is found, the target access network device needs to modify the configuration. Consequently, additional signaling is required for modifying the previous configuration, resources are wasted, and a transmission delay is caused. Therefore, an embodiment of this application provides a communication method, so that the target access network device can properly configure a corresponding session.

Figure 3:
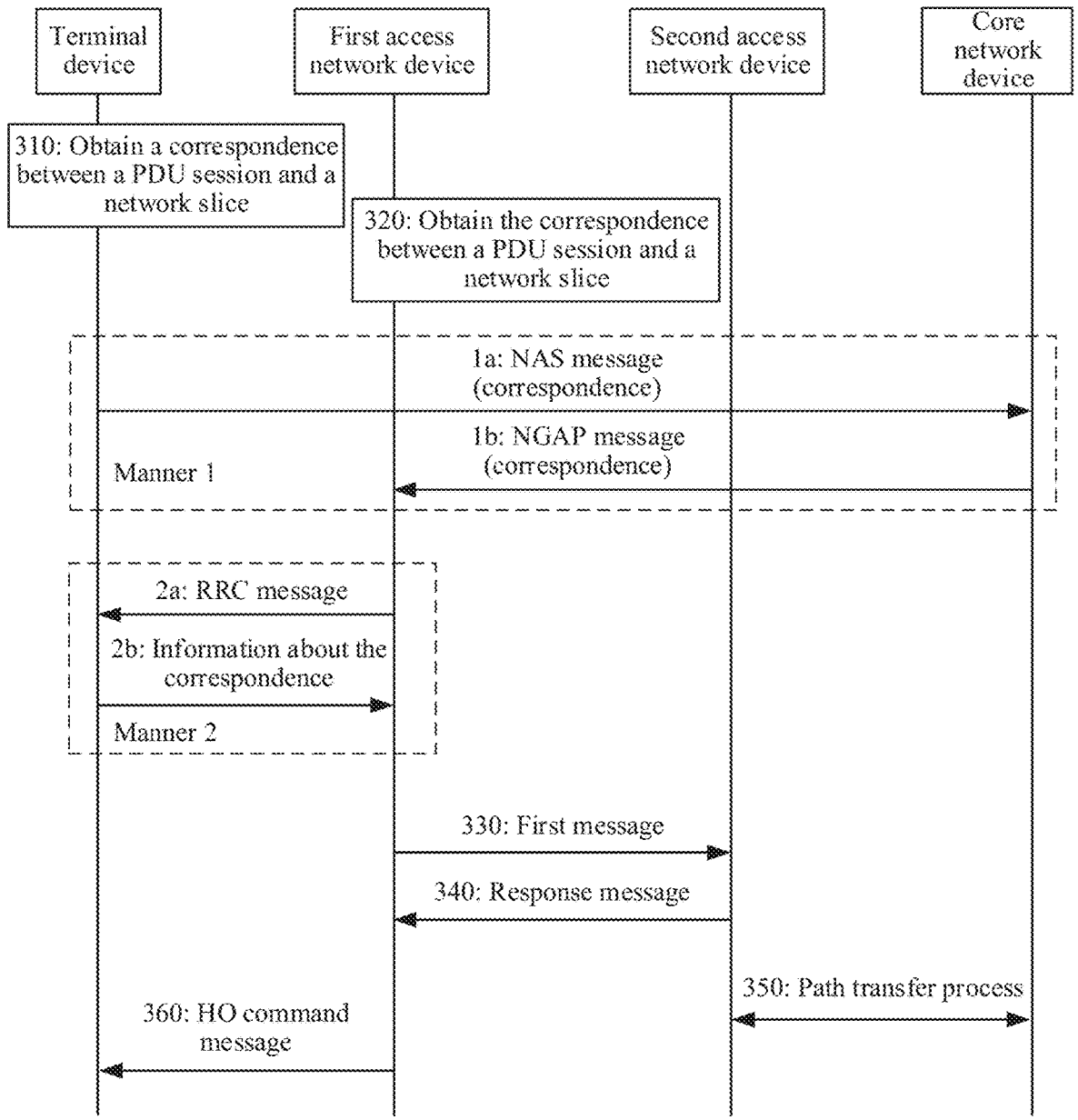
FIG. 3 is a schematic interaction diagram of a communication method according to an embodiment of this application.

FIG. 3 is a schematic diagram of a communication method according to an embodiment of this application. The method of FIG. 3 may be applied to the network architecture in FIG. 1. As shown in FIG. 3, a first access network device does not support a network slice corresponding to a session of a terminal device, or does not support a feature of the network slice; and a second access network device supports the feature of the network slice. The method includes steps 310 to 360. The following describes in detail the steps in FIG. 3.

310: The terminal device obtains information about a correspondence, where the correspondence includes a correspondence between a session of the terminal device and a network slice.

It should be understood that the session may be a session established between the terminal device and the first access network device, the session may be a PDU session, the PDU session is a session established between the terminal device and the first access network device, and the PDU session may be initiated or established by the terminal device, or may be initiated and established by the first access network device, or may be initiated and established by a core network. This is not limited in this embodiment of this application. For example, the first access network device establishes three PDU sessions for the terminal device, and the three PDU sessions are separately a PDU session 1, a PDU session 2, and a PDU session 3. In other words, the first access network device allocates a resource to each of the PDU session 1, the PDU session 2, and the PDU session 3.

Optionally, the terminal device may determine a correspondence between a PDU session and a network slice. For example, the correspondence is determined by using a network slice selection policy (Network Slice Selection Policy, NSSP) or a terminal route selection policy (UE Route Selection Policy, URSP) stored in the terminal device. For example, by using the NSSP, it is determined that the PDU session 1 corresponds to a network slice 1, the PDU session 2 corresponds to a network slice 2, and the PDU session 3 corresponds to a network slice 3. The NSSP includes a rule related to network slice selection, to assist a user in completing a network slice selection function.

Optionally, the terminal device may alternatively obtain the correspondence between a PDU session and a network slice from a core network device. For example, the terminal device obtains the correspondence between a PDU session and a network slice by using a non-access stratum (Non-access stratum, NAS) message.

The correspondence between a PDU session and a network slice may be that one PDU session corresponds to one network slice, or may be that one PDU session corresponds to a plurality of network slices (in other words, more than one network slice). In this embodiment of this application, correspondingly, it may be understood that the PDU session belongs to a specific network slice, or the PDU session is established on a network slice corresponding to the PDU session, or a network side (for example, a core network or an access network) allocates, to the PDU session, a resource of a network slice corresponding to the PDU session. The correspondence between a PDU session and a network slice may be represented by using a PDU session identifier and a network slice identifier. For example, the PDU session identifier corresponds to the network slice identifier. Specifically, the PDU session represented by the PDU session identifier belongs to the network slice represented by the network slice identifier corresponding to the PDU session identifier, or the PDU session represented by the PDU session identifier is established on the network slice represented by the network slice identifier corresponding to the PDU session identifier, or the network side allocates, to the PDU session represented by the PDU session identifier, a resource of the network slice represented by the corresponding network slice identifier. The network slice identifier may be represented by using the foregoing parameters that indicate a network slice identifier. Optionally, a representation form of the correspondence between a PDU session and a network slice may be a correspondence between a PDU session identifier and a network slice identifier. For example, if the PDU session 1 corresponds to the network slice 1, it may be understood that the PDU session 1 is established on the network slice 1, or it may be understood that the PDU session 1 belongs to the network slice 1, or it may be understood that the PDU session 1 is associated with the network slice 1.

The following describes the correspondence between a PDU session and a network slice.

Optionally, the network slice includes a first network slice, a first session corresponds to the first network slice, the correspondence includes a first relationship, and the first relationship includes a correspondence between the first session and the first network slice.

Specifically, one PDU session corresponds to one network slice. The PDU session 1 (namely, an example of the first session) is used as an example. The PDU session 1 corresponds to one network slice 1 (namely, an example of the first network slice), the correspondence includes the first relationship, and the first relationship is a correspondence between the PDU session 1 and the network slice 1. In other words, the correspondence between a PDU session and a network slice may include the first relationship in which one PDU session corresponds to one network slice. For example, the first relationship may be represented in a form in Table 1, and a second relationship may be represented in a form in Table 2.

TABLE 1

| Slice matching information | Which indicates a correspondence between a PDU session and a network slice, and a specific name is not limited. |
|---|---|
| Slice matching information item | Which indicates a correspondence between a PDU session and a network slice, and a specific name is not limited. |
| >>PDU session identifier | |
| >>Network slice identifier | |

TABLE 2

| Remapping policy information | Which indicates a correspondence between a PDU session and a network slice, and a specific name is not limited. |
|---|---|
| >Remapping policy information item | Which indicates a correspondence between a PDU session and a network slice, and a specific name is not limited. |
| >>PDU session identifier | |
| >>Network slice identifier list | Which includes one or more network slice identifiers. |

Optionally, the network slice further includes a second network slice, and the correspondence further includes information about the second relationship between the first session and the second network slice.

When the second access network device does not support the first network slice, the second access network device may provide, based on the second relationship, a service for the PDU session 1 by using the second network slice.

Optionally, the network slice further includes a third network slice, and the first relationship further includes a correspondence between the first session and the third network slice.

In other words, the correspondence includes a correspondence between the first session and a plurality of network slices, namely, a correspondence between one PDU session and a plurality of network slices, and the correspondence is denoted as a third relationship. The PDU session 2 is used as an example. It is assumed that the PDU session 2 corresponds to the network slice 1 and the network slice 3, so that the third relationship is a correspondence between the PDU session 2 and network slices 1 and 3. In other words, the correspondence between a PDU session and a network slice may be the third relationship in which one PDU session corresponds to a plurality of network slices. In other words, one PDU session may alternatively correspond to a plurality of network slices, and each of the plurality of network slices may provide a service for the PDU session. However, only one network slice finally provides a service for the PDU session. Specifically, the PDU session 2 corresponds to the network slice 1 and the network slice 3. For example, the third relationship may be represented in a form in Table 3.

TABLE 3

| | |
|---|---|
| Slice matching information | Which indicates a correspondence between a PDU session and a network slice, and a specific name is not limited. |
| >Slice matching information item | Which indicates a correspondence between a PDU session and a network slice, and a specific name is not limited. |
| >>PDU session identifier | |
| >>Network slice identifier list | Which includes one or more network slice identifiers. |

It should be understood that the foregoing uses an example in which the PDU session 2 corresponds to the network slice 1 and the network slice 3 for description. The PDU session 2 may alternatively correspond to more than two network slices.

It should be understood that the correspondence between a PDU session and a network slice may include a correspondence (namely, the first relationship) between one PDU session and one network slice, or may include the correspondence (namely, the third relationship) between one PDU session and a plurality of network slices.

Optionally, when a PDU session corresponds to at least two network slices, the at least two network slices are arranged based on priorities. Specifically, the priorities are arranged based on quality of service, a session feature, a deployment status of an operator network, or the like. This is not limited in this embodiment of this application. A plurality of network slices corresponding to the PDU session are arranged in a specific priority sequence. When determining, based on the plurality of network slices, a unique network slice that provides a service for the PDU session, the second access network device may select, with reference to a radio resource status of the second access network device and based on the priority sequence, the network slice sequentially from a network slice corresponding to a high priority to a network slice corresponding to a low priority. It may be understood that when the PDU session corresponds to at least two network slices, the at least two network slices may be arranged in descending order of the priorities, or may be arranged in ascending order of the priorities.

320: The first access network device obtains the information about the correspondence from the terminal device.

As described above, the correspondence includes the correspondence between a PDU session and a network slice, and the PDU session is a session corresponding to the terminal device. After the first access network device obtains the correspondence, the first access network device may notify the second access network device of the correspondence, so that the second access network device may determine a network slice based on the correspondence, and perform resource configuration, to avoid a configuration error.

The first access network device obtains the correspondence in at least the following two manners:

Manner 1

1a: The terminal device sends a non-access stratum (Non-access stratum, NAS) message to the core network device (for example, an AMF). The NAS message is forwarded by the first access network device, and the message includes information about the correspondence between a PDU session and a network slice.

It should be understood that before sending the NAS message to the core network device, the terminal device already obtains the correspondence between a PDU session and a network slice.

1b: The core network device sends a notification message to the first access network device, where the notification message may be an NG interface application protocol (NG Application Protocol, NGAP) message, the NGAP message includes the information about the correspondence between a PDU session and a network slice, and the first access network device stores the correspondence after receiving the correspondence. The NGAP message may be a UE context establishment message, a PDU session establishment message, a UE context modification message, a PDU session modification message, or another message. Optionally, the NGAP message may further include capability information of the terminal, for example, a maximum quantity of accessible network slices.

Manner 2

2a: The first access network device sends an RRC message to the terminal device, where the RRC message carries instruction information, and the instruction information instructs the terminal device to send the correspondence between a PDU session and a network slice to the first access network device. Optionally, the instruction information may instruct the terminal device to determine the correspondence between a PDU session and a network slice. The instruction information may be a message type (Message Type), or may be specific information in the existing RRC message, for example, an information element (Information Element, IE) newly added to the existing RRC message.

It should be understood that, in step 310, that the terminal device determines the correspondence between a session and a network slice may be that the terminal device already determines the correspondence before receiving the instruction information in step 2a, or may be that the terminal device determines, after receiving the instruction information, the correspondence according to an instruction of the instruction information. This is not limited in this embodiment of this application.

Optionally, the RRC message may further include PDU session identification information, and the PDU session identification information is used to identify a PDU session that needs to be sent by the terminal device. For example, for the three sessions, separately the PDU session 1, the PDU session 2, and the PDU session 3, of the terminal device, the PDU session identification information identifies the PDU session 1 and the PDU session 2, so that the terminal device obtains, based on the PDU session identification information, network slices separately corresponding to the PDU session 1 and the PDU session 2, and sends, to the first access network device, a correspondence between the PDU session 1 and a corresponding network slice, and a correspondence between the PDU session 2 and a corresponding network slice.

Optionally, the RRC message includes first condition information, and the first condition information is used to instruct the terminal device to send, when a preset first condition is met, the correspondence between a PDU session and a network slice to the first access network device. The preset first condition may be that a specified measurement object, a specified cell, or a specified base station in a measurement report meets a measurement reporting condition, or may be that the terminal is about to move out of a registration area (Registration Area) or a current tracking area (Tracking Area) allocated by the network side to the terminal, or may be that a potential target cell includes a cell outside a current registration area or tracking area of the terminal, or may be that a potential handover target includes a cell or a base station that supports a network slice, or may be that at least one cell or base station or measurement object that supports a network slice meets a measurement reporting condition, or may be that a to-be-reported measurement report includes at least one cell or base station or measurement object that supports a network slice, or may be that a cell or a base station corresponding to at least one cell identifier or base station identifier carried in a measurement report supports a network slice.

It should be noted that when the RRC message does not include the first condition information, after receiving the instruction information, the terminal device sends the correspondence between a PDU session and a network slice when a second condition is met. The second condition may be preset, or may be a condition specified in a protocol, or may be the same as the first condition. This is not limited herein in this embodiment of this application herein.

Optionally, the RRC message may be an RRC reconfiguration message, or may be a measurement request message, or may be an RRC connection reconfiguration message, or may be an RRC establishment message, or may be a UE capability request message, or may be a UE information request message, or may be a measurement configuration message. This is not limited in this embodiment of this application.

2b: After receiving the RRC message, the terminal device determines the correspondence between a PDU session and a network slice based on the instruction information in the RRC message, and sends the correspondence between a PDU session and a network slice to the first access network device.

It should be understood that, alternatively, the terminal device may already determine the correspondence between a PDU session and a network slice before receiving the RRC message.

Optionally, after receiving the instruction information, the terminal device sends the correspondence between a PDU session and a network slice in the measurement report by default.

It should be understood that the correspondence between a PDU session and a network slice is similar to the correspondence between a PDU session and a network slice that is mentioned in step 310, and details are not described herein again. It should be understood that the PDU session 1 and the PDU session 2 are merely examples for description.

Optionally, the terminal device may determine the correspondence between a PDU session and a network slice based on the PDU session identification information in the RRC message. Specifically, in 2a, for the three sessions, separately the PDU session 1, the PDU session 2, and the PDU session 3, of the terminal device, the PDU session identifier identifies the PDU session 1 and the PDU session 2, so that after receiving the PDU session identification information, the terminal device may determine the PDU session 1 and the PDU session 2 based on the PDU session identification information. Therefore, the terminal device only needs to determine the network slices corresponding to the PDU session 1 and the PDU session 2, and send, to the first access network device, the correspondence between the PDU session 1 and the corresponding network slice and the correspondence between the PDU session 2 and the corresponding network slice.

Optionally, the RRC message received by the terminal device includes the first condition information, and the terminal device determines the correspondence between a PDU session and a network slice when the preset first condition is met, and sends the correspondence between a PDU session and a network slice to the first access network device. The preset first condition may be that a specified measurement object, a specified cell, or a specified base station in a measurement report meets a measurement reporting condition, or may be that the terminal is about to move out of a registration area (Registration Area) or a current tracking area (Tracking Area) allocated by the network side to the terminal, or may be that a potential handover target includes a cell or a base station that supports a network slice, or may be that at least one cell or base station or measurement object that supports a network slice meets a measurement reporting condition.

Optionally, the RRC message may further include capability information of the terminal, for example, a maximum quantity of accessible network slices.

Optionally, the correspondence between a PDU session and a network slice may be carried in a reply message sent by the terminal device to the first access network device. The reply message may be a measurement report message, or may be the capability information of the terminal, or may be an RRC reconfiguration complete message, or may be an RRC establishment complete message, or may be an RRC resume complete message, or may be an RRC re-establishment complete message. This is not limited herein.

It should be understood that the foregoing enumerated manners in which the first access network device obtains the correspondence between a network slice and a PDU session are merely examples for description. This embodiment of this application is not limited thereto. Another method and process that can enable the first access network device to obtain the correspondence fall within the protection scope of this application. For example, the first access network device may obtain the first relationship and the second relationship in different manners. For example, the first relationship is obtained in Manner 1, and the second relationship is obtained in Manner 2. Alternatively, the second relationship may be obtained in Manner 1, and the first relationship may be obtained in Manner 2. Certainly, alternatively, both the first relationship and the second relationship may be obtained in Manner 1 or Manner 2. This is not limited herein.

330: The first access network device sends a first message to the second access network device, where the first message includes the correspondence between a session and a network slice. The first message is a handover (Handover, HO) request message.

Herein, it is assumed that the first access network device and the second access network device may interact with each other by using an Xn interface. There may be two manners. In a first manner, the correspondence between a PDU session and a network slice may be transferred as an Xn interface application protocol (Xn Application Protocol, XnAP) message. In a second manner, the correspondence between a PDU session and a network slice is transferred to the second access network device as a piece of container information. For example, if the first access network device cannot parse information about a network slice, the first access network device does not parse the information about the network slice, but transfers the information about the network slice to the second access network device only as a piece of container information, and the second access network device parses the information. Certainly, even if the first access network device may parse the information about the network slice, the first access network device may transfer the correspondence between a PDU session and a network slice in a form of container information.

Specifically, when the first access network device adds a relationship between a PDU session and a network slice to the HO request message in a form of container information and sends the HO request message to the second access network device, a message form in Table 4 or Table 5 may be used.

TABLE 4

| Information element/<br>Group name | Semantic description |
| --- | --- |
| Message type | |
| Cause value | |
| Target cell identifier | Which indicates a target cell, and the target cell may be a 4G cell or a 5G cell. |
| UE context message | |
| >Slice matching information | The information may be a piece of container information, and indicates a correspondence between a session that requests to be handed over and a network slice, in other words, indicates a network slice to which a session that requests to be handed over belongs |
| >Session resource configuration list | |

TABLE 5

| Information element/<br>Group name | Semantic description |
| --- | --- |
| Message type | |
| Cause value | |
| Target cell identifier | Which indicates a target cell, and the target cell may be a 4G cell or a 5G cell. |
| Slice matching information | The information may be a piece of container information, and indicates a correspondence between a session that requests to be handed over and a network slice, in other words, indicates a network slice to which a session that requests to be handed over belongs. |
| UE context message | |
| >Session resource configuration list | |

Optionally, the first message may further include capability information of the terminal, for example, a maximum quantity of accessible network slices.

It should be understood that the correspondence in the first message may include the first relationship, or may include the first relationship and the second relationship.

It should be understood that the correspondence transmitted in this step may be different from the correspondence in step 320. For example, step 330 includes only a part of the correspondence obtained in step 320. For example, in step 320, the first access network device obtains a correspondence between the PDU session 1 and the network slice 1, a correspondence between the PDU session 2 and the network slice 2, and a correspondence between the PDU session 3 and the network slice 3. However, in a handover process, because the PDU session 1 has no data to transmit or the first access network device determines that the second access network device does not support the PDU session 1, in step 330, the correspondence sent by the first access network device to the second access network device includes only the correspondence between the PDU session 2 and the network slice 2, and the correspondence between the PDU session 3 and the network slice 3.

After obtaining the correspondence, the second access network device may determine a network slice for a PDU session based on the correspondence.

The PDU session 1 is used as an example for description. Optionally, when the second access network device supports the network slice 1, and the network slice 1 can provide a service for the PDU session 1 (where for example, a resource of the network slice 1 in the second access network device can meet a quality of service requirement of the PDU session 1), the second access network device determines the network slice 1 based on the first relationship, and performs protocol stack configuration, for example, protocol stack parameter configuration. When the second access network device does not support the network slice 1, or the network slice 1 cannot provide a service for the PDU session 1 due to a limited radio resource, the second access network device determines, based on the second relationship and with reference to a priority arrangement sequence, one network slice from the network slice 2 and the network slice 3, to provide a service for the PDU session 1, or the second access network device rejects access by the PDU session 1.

Alternatively, the PDU session 2 is used as an example. The PDU session 2 corresponds to the network slice 1 and the network slice 3. The second access network device determines, based on the third relationship, that network slices provided for the PDU session 2 are the network slice 1 and the network slice 3; and determines, based on information such as the priority arrangement sequence and available resources of the network slice 1 and the network slice 3, one network slice from the network slice 1 and the network slice 3, to provide a service for the PDU session 2.

340: The second access network device sends a response message to the first access network device, where the response message is a response to the first message. The response message is an HO request feedback message.

350: The second access network device performs a path transfer process with the core network device.

Optionally, in the path transfer process, the second access network device sends the correspondence between a PDU session and a network slice to the core network device, and the core network device may modify the correspondence between a PDU session and a network slice based on an actual situation.

360: The first access network device sends an HO command message to the terminal device. Optionally, this step includes the correspondence between a PDU session and a network slice.

It should be noted that, in this embodiment of this application, the correspondence between a session of the terminal device and a network slice is used as an example for describing the correspondence, but the correspondence is not limited thereto. For example, the correspondence may alternatively be a correspondence between a bearer and a network slice, or a correspondence between a data flow (for example, a QoS flow or an IP flow) and a network slice.

It should be understood that, sequence numbers of the foregoing processes do not mean an execution sequence. The execution sequence of the processes should be determined based on functions and internal logic of the processes, and should not be construed as any limitation on the implementation processes of the embodiments of this application.

In this embodiment of this application, after obtaining the correspondence between a network slice and a session, the first access network device notifies the second access network device, so that the second access network device properly configures the corresponding session based on the correspondence. This can avoid a transmission problem caused by a configuration error, and can also avoid a problem of an air interface resource waste caused by a re-access requirement that is brought by the configuration error.

In FIG. 3, the first access network device may be considered as a source access network device, and the second access network device may be considered as a target access network device.

Figure 4:
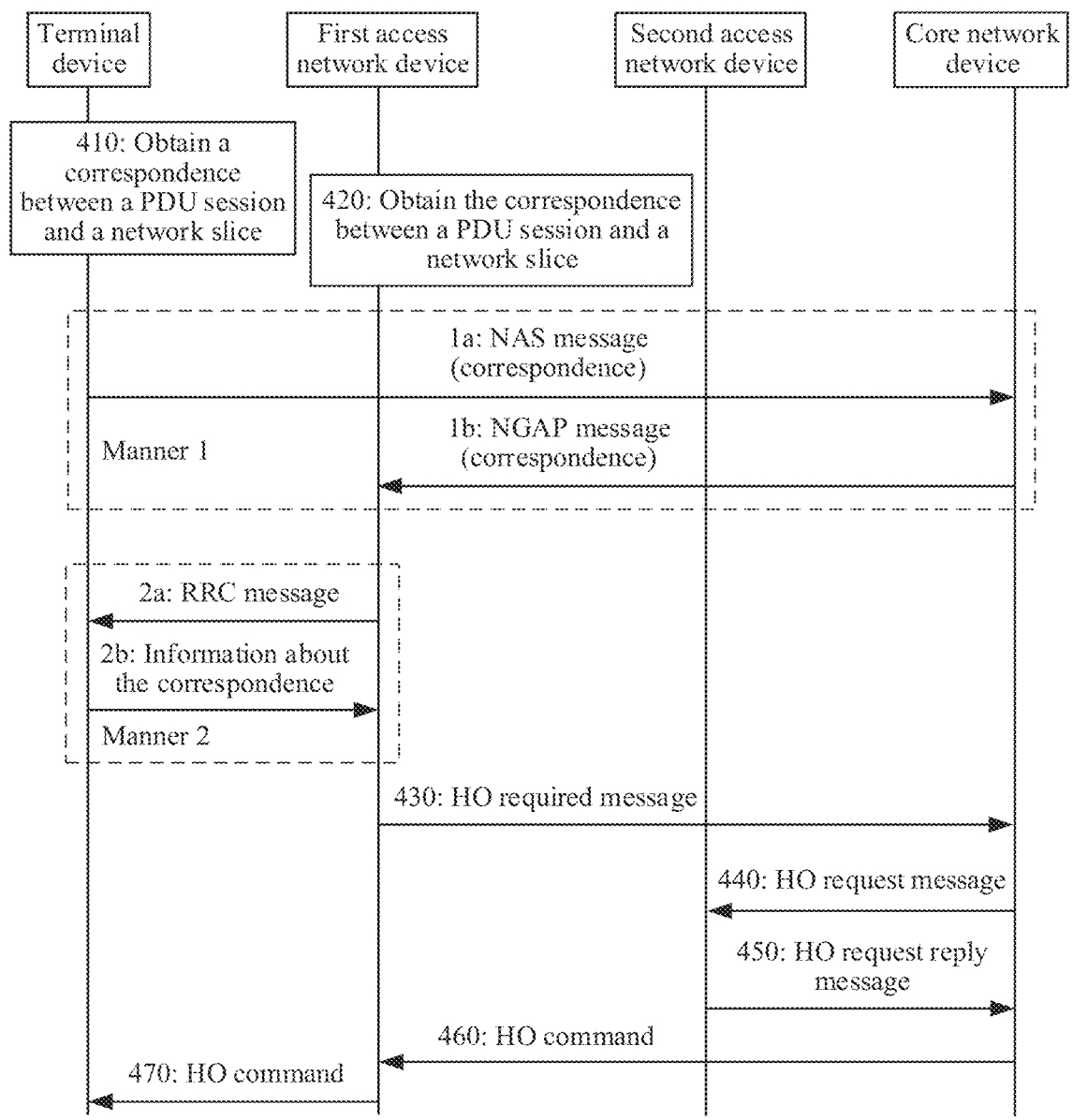
FIG. 4 is a schematic interaction diagram of a communication method according to another embodiment of this application.

In the embodiment of FIG. 3, there is a communications interface between the first access network device and the second access network device, so that the first access network device and the second access network device may communicate with each other. The communication method in this embodiment of this application is also applicable to a scenario in which there is no communications interface between the two access network devices, as shown in FIG. 4. FIG. 4 is a schematic diagram of a communication method according to another embodiment of this application. The method of FIG. 4 may be applied to the network architecture in FIG. 1. As shown in FIG. 4, the method 400 includes steps 410 to 470. The following describes in detail the steps in FIG. 4.

410: A terminal device obtains a correspondence between a PDU session and a network slice.

Specifically, this step is similar to step 310 in FIG. 3, and details are not described herein again.

420: A first access network device obtains information about the correspondence, where the correspondence includes a correspondence between a session of the terminal device and a network slice.

Specifically, this step is similar to step 320 in FIG. 3, and details are not described herein again.

430: The first access network device sends an HO required (HO Required) message to a core network device, where the HO required message includes the correspondence between a PDU session and a network slice. The HO required message may be a handover required message.

In this embodiment of this application, after receiving the correspondence between a PDU session and a network slice, optionally, the core network device may directly send the correspondence to a second access network device. Alternatively, the core network device (which may be an AMF, or may be a session management function (Session Management Function, SMF) entity) may confirm or modify the received correspondence between a session and a network slice.

If the core network device does not determine the correspondence between a PDU session and a network slice, when allocating a network slice to a PDU session that needs to be handed over, the core network device does not know a network slice corresponding to the PDU session. Therefore, the core network device performs a matching process, and consequently a delay is caused. In this embodiment of this application, the core network device learns of the correspondence between a PDU session and a network slice, to avoid a delay problem caused by matching.

440: The core network device sends an HO request message to the second access network device, where the HO request message may be a handover request message.

Optionally, the HO request message carries the correspondence between a PDU session and a network slice, and the correspondence between a PDU session and a network slice is the same as the correspondence in step 430.

Optionally, after receiving the correspondence between a PDU session and a network slice that is carried in step 430, the core network device determines, on a core network side (which may be an AMF an SMF, or another core network entity, and is not limited herein) and based on information such as the correspondence between a PDU session and a network slice and a network slice supported by the second access network device, a network slice corresponding to the PDU session that needs to be handed over, where a correspondence between the PDU session that needs to be handed over and the network slice is denoted as a fourth relationship; and adds, to the HO request message, the correspondence, determined by the core network, between the PDU session that needs to be handed over and the network slice. The correspondence, carried in the HO request message, between the PDU session that needs to be handed over and the network slice may be the same as the correspondence in step 430, or may be different from the correspondence in step 430. In other words, the fourth relationship may be the same as or different from the first relationship or third relationship carried in step 430. For example, sessions that need to be handed over and that are received by the core network device in step 430 include a PDU session 1, a PDU session 2, and a PDU session 3, the PDU session 1 corresponds to a network slice 1, the PDU session 2 corresponds to a network slice 2, and the PDU session 3 corresponds to a network slice 3. After receiving the information, the core network device determines, based on information such as a network slice supported by the second access network device or a remapping policy, a network slice corresponding to each session. For example, if the second access network device supports only the network slice 1 and the network slice 3, the core network device determines that the PDU session 1 and the PDU session 2 correspond to the network slice 1, and the PDU session 3 corresponds to the network slice 3. Then the correspondence is carried in an HO request message for sending. It may be understood that in this process, the core network device may alternatively transmit the correspondence received in step 230 to an SMF or an NSSF, and then the SMF or the NSSF determines the fourth relationship. For example, in the foregoing example, the PDU session 1 and the PDU session 2 correspond to the network slice 1, and the PDU session 3 corresponds to the network slice 3. After the SMF or the NSSF determines the fourth relationship, the SMF or the NSSF transmits the fourth relationship to the core network device, and then the core network device adds the fourth relationship to the HO request message and sends the HO request message to a T-RAN.

Optionally, when step 430 includes a second relationship, the core network device, for example, the core network device or the NSSF, may re-determine the second relationship, and after the second relationship is re-determined, a correspondence between a PDU session and a network slice is a fifth relationship. For example, in the second relationship, the PDU session 1 may correspond to the network slice 1, the network slice 2, and the network slice 3, so that the core network device may re-determine, based on position information of the terminal, update information of a service requirement, information about a network slice supported by the T-RAN, or the like, the correspondence as that the PDU session 1 may correspond to the network slice 1, the network slice 3, and a network slice 4.

It should be noted that the correspondence, carried in the HO request message, between a PDU session that needs to be handed over and a network slice may be the first relationship mentioned in FIG. 3, in other words, one PDU session corresponds to one network slice; or may be the third relationship, in other words, one PDU session corresponds to a plurality of (more than one) network slices; or may include both the first relationship and the second relationship; or may include only the fourth relationship; or may include both the fourth relationship and the second relationship; or may include both the fourth relationship and the fifth relationship. This is not limited in this embodiment of this application.

Optionally, the HO request message includes the correspondence between a PDU session and a network slice in step 430.

It may be understood that both the correspondence, determined by the core network, between a PDU session and a network slice and the correspondence between a PDU session and a network slice in step 430 may be carried in step 440, or either of the two correspondences may be carried in step 440.

450: The second access network device sends an HO request reply message to the core network device, where the HO request reply message may be a handover request acknowledge message.

460: The core network device sends an HO command to the first access network device.

470: The first access network device sends the HO command to the terminal device.

It should be noted that in this embodiment of this application, the core network device may need to be replaced in a handover process. However, regardless of whether the core network device is replaced, the general method in this embodiment of this application can still avoid a delay problem caused by matching when the core network device performs matching between a session and a network slice.

It should be understood that, sequence numbers of the foregoing processes do not mean an execution sequence. The execution sequence of the processes should be determined based on functions and internal logic of the processes, and should not be construed as any limitation on the implementation processes of the embodiments of this application.

In this embodiment of this application, after obtaining the correspondence between a network slice and a session, the first access network device notifies the core network device, so that the core network device performs matching for the corresponding session based on the correspondence, and the delay problem caused by matching can be avoided.

Figure 5:
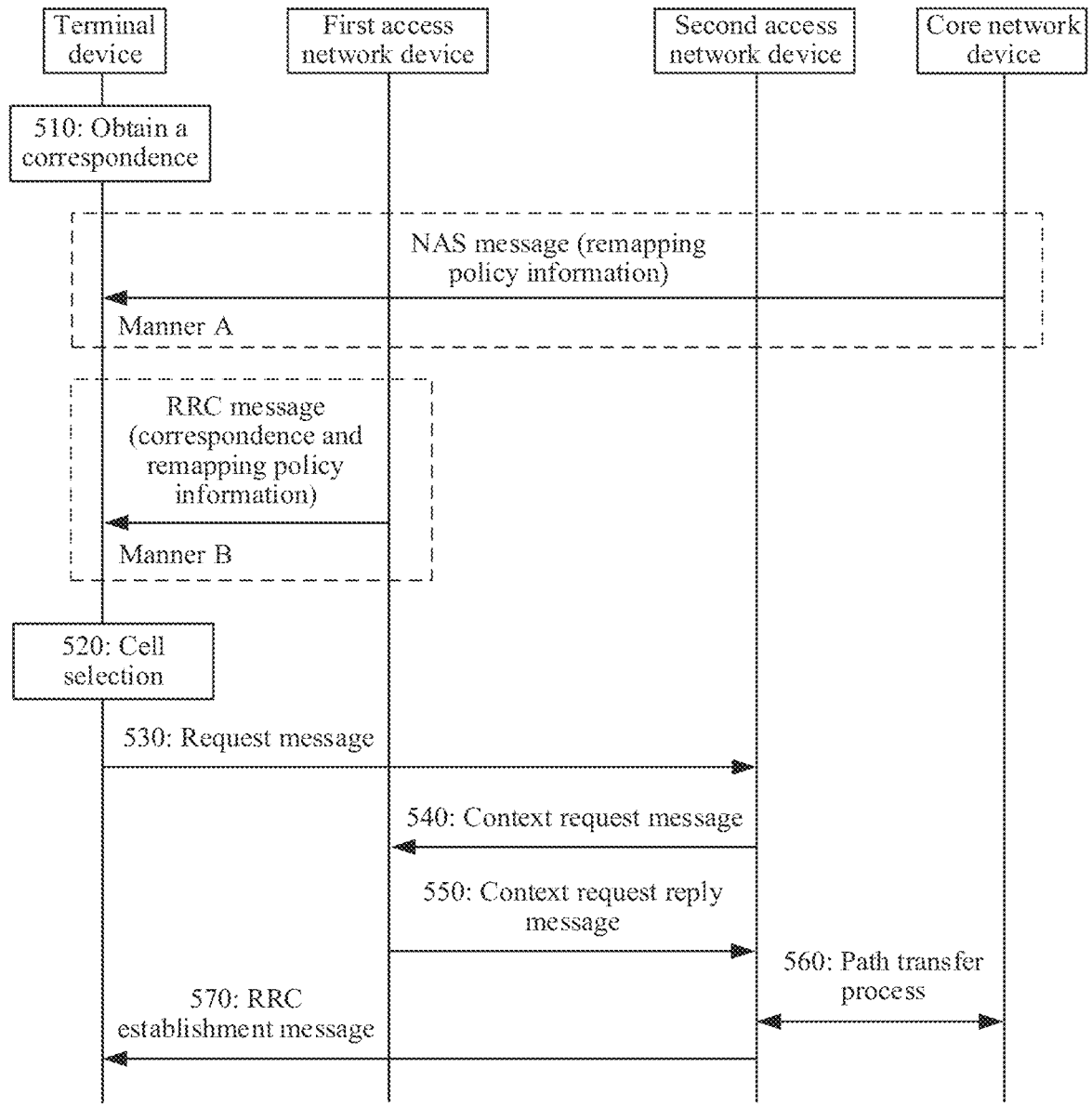
FIG. 5 is a schematic interaction diagram of a communication method according to still another embodiment of this application.

FIG. 5 is a schematic diagram of a communication method according to still another embodiment of this application. The method of FIG. 5 may be applied to the network architecture in FIG. 1. The terminal device 105 in FIG. 1 is used as an example. The method may be applied to a scenario in which the terminal device 105 performs cell reselection. Both a first access network device and a second access network device support a feature of a network slice. As shown in FIG. 5, the method includes steps 510 to 570. The following describes in detail the steps in FIG. 5.

510: The terminal device receives information about a correspondence that is sent by the first access network device, where the correspondence includes a correspondence between a session of the terminal device and a network slice.

The information about the correspondence may be carried in an RRC message sent by the first access network device to the terminal device. In other words, the first access network device notifies the terminal device of information about a network slice corresponding to a current session of the terminal device.

Optionally, the terminal device obtains remapping policy information.

The remapping policy information is used to instruct to remap at least one session used by the terminal device to communicate with the first access network device or a session supported by the terminal device from at least one original network slice to which the session is mapped, to at least one network slice other than the original network slice. The network slice remapping policy information may be a set of network slice indication information. The PDU session 1 in FIG. 3 is used as an example. The PDU session 1 is a session currently performed by the terminal device, and the PDU session 1 belongs to the network slice 1. In other words, the PDU session 1 is mapped to the network slice 1. The network slice remapping policy information indicates that the PDU session 1 may be remapped to the network slice 2 and/or the network slice 3.

The terminal device obtains the remapping policy information in at least the following two manners:

Manner A:

A core network device sends a NAS message to the terminal device, where the NAS message includes the network slice remapping policy information. A core network side may determine the network slice remapping policy information.

Manner B

The RRC message sent by the first access network device to the terminal device further includes the network slice remapping policy information.

It should be understood that the foregoing enumerated manners in which the terminal device obtains the remapping policy information are merely examples for description. This embodiment of this application is not limited thereto. Another method and process that can enable the terminal device to obtain the correspondence and the remapping policy information fall within the protection scope of this application.

520: The terminal device selects a cell. For example, after a radio link failure (Radio Link Failure, RLF) occurs on the terminal device, cell reselection is performed. In a cell reselection process, the terminal device selects a cell based on the network slice corresponding to the current session. For example, the selected cell may support the network slice corresponding to the current session. For example, in the cell reselection process, the terminal finds, through measurement, that a channel condition of each of a cell 1 and a cell 2 can support camping of the terminal, and a channel condition between the terminal and the cell 1 is better than a channel condition between the terminal and the cell 2. However, the terminal currently has a PDU session 1 and a PDU session 2, respectively corresponding to a network slice 1 and a network slice 2, the cell 1 supports only the network slice 1 but does not support the network slice 2, and the cell 2 supports both the network slice 1 and the network slice 2. In this case, a user may select the cell 2 as a new serving cell of the user, instead of the cell 1 that has a better channel condition.

Optionally, the terminal device may alternatively perform cell reselection based on the remapping policy information. For example, the selected cell may support a network slice obtained after remapping.

Optionally, the terminal device may select a cell based on the network slice corresponding to the current session. For example, the selected cell may support the network slice corresponding to the current session.

Optionally, the terminal device may alternatively select a cell based on the network slice corresponding to the current session and the remapping policy information. For example, the selected cell may support the network slice corresponding to the current session and/or a network slice determined by the remapping policy information.

530: The terminal device sends a request message to a second access network device, where the request message is used to request to establish a connection between the second access network device and the terminal device. The request message may be an RRC re-establishment request message.

The second access network device may be determined based on the correspondence and/or the remapping policy information.

540: The second access network device sends a context request message to the first access network device.

550: The first access network device sends a context request reply message to the second access network device. Optionally, the message includes the remapping policy information, and the second access network device may remap, when a network slice corresponding to the session is not supported or the network slice corresponding to the session does not have enough group members, the session to another network slice based on the included remapping policy information. A specific step is similar to the description in step 330.

560: A path transfer process is performed between the second access network device and the core network device.

570: The second access network device sends an RRC establishment message to the terminal device.

It should be understood that step 510 may be applied, as an independent implementation step, to another process, for example, a handover process, and the correspondence between a PDU session and a network slice and/or the remapping policy information may also be carried in the RRC message, for example, an HO command message.

It should be understood that, sequence numbers of the foregoing processes do not mean an execution sequence. The execution sequence of the processes should be determined based on functions and internal logic of the processes, and should not be construed as any limitation on the implementation processes of the embodiments of this application.

According to this embodiment of this application, the terminal device obtains the network slice corresponding to the current session and the network slice to which the session can be remapped, and when performing the cell reselection, the terminal device may select a proper cell.

The foregoing describes in detail the communication methods in the embodiments of this application with reference to FIG. 1 to FIG. 5. The following describes in detail the network device and the terminal device in the embodiments of this application with reference to FIG. 6 to FIG. 13.

Figure 6:
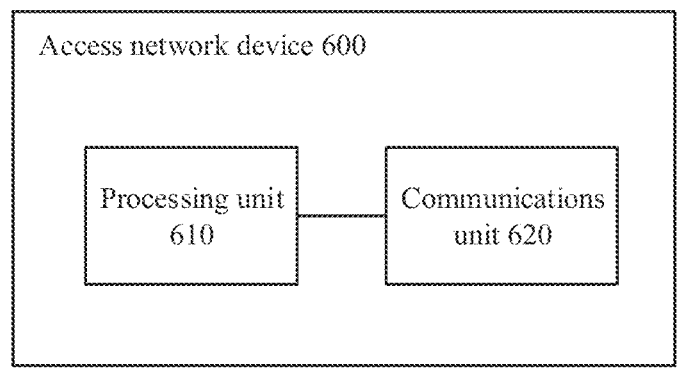
FIG. 6 is a schematic diagram of an access network device according to an embodiment of this application.

FIG. 6 is a schematic block diagram of an access network device 600 according to an embodiment of this application. It should be understood that the access network device 600 can perform the steps performed by the first access network device in the methods of FIG. 1 to FIG. 5. To avoid repetition, details are not described herein again. The access network device 600 includes a processing unit 610 and a communications unit 620.

The processing unit 610 is configured to: obtain, by using the communications unit 620, information about a correspondence from a terminal device, where the correspondence is a correspondence between a session and a network slice, and the session is a session corresponding to the terminal device; and send, by using the communications unit 620, the information about the correspondence to a second access network device. The information about the correspondence may be used to instruct the second access network device to determine a network slice for the session.

Optionally, the session includes a first session, the network slice includes a first network slice, and the first session corresponds to the first network slice; and the correspondence includes a first relationship, and the first relationship is a correspondence between the first session and the first network slice.

Optionally, the processing unit 610 is further configured to obtain, by using the communications unit 620, information about a second relationship between the first session and a second network slice. The information about the second relationship may be used to instruct to remap the first session from the first network slice to at least one second network slice.

Optionally, the information about the second relationship comes from the terminal device or a core network device.

Optionally, the session includes a second session, the network slice includes at least two network slices, and the second session corresponds to the at least two network slices; and the correspondence includes a third relationship, and the third relationship is a correspondence between the second session and the at least two network slices.

Optionally, the processing unit 610 is further configured to arrange the at least two network slices based on priorities, and that the processing unit 610 is further configured to send the information about the correspondence to the second access network device by using the communications unit 620, where the information about the correspondence is used to instruct the second access network device to determine the network slice for the session includes: the processing unit 610 is further configured to send, by using the communications unit 620, the information about the second relationship to the second access network device, where the information about the second relationship is used to instruct the second access network device to determine, for the second session, one network slice from the at least two network slices based on the priorities.

Optionally, the obtaining, by using the communications unit 620, information about a correspondence from a terminal device includes: receiving, by using the communications unit 620, the information about the correspondence that is sent by the core network device, where the information about the correspondence is information obtained by the core network device from the terminal device.

Optionally, the obtaining, by using the communications unit 620, information about a correspondence from a terminal device includes: sending, by using the communications unit 620, instruction information to the terminal device, where the instruction information is used to instruct the terminal device to send the correspondence to the access network device 600; and receiving, by using the communications unit 620, the information about the correspondence that is sent by the terminal device.

Optionally, the instruction information is further used to instruct the terminal device to send, when a preset first condition is met, the correspondence to the access network device 600.

Optionally, the instruction information is carried in radio resource control RRC signaling.

Figure 7:
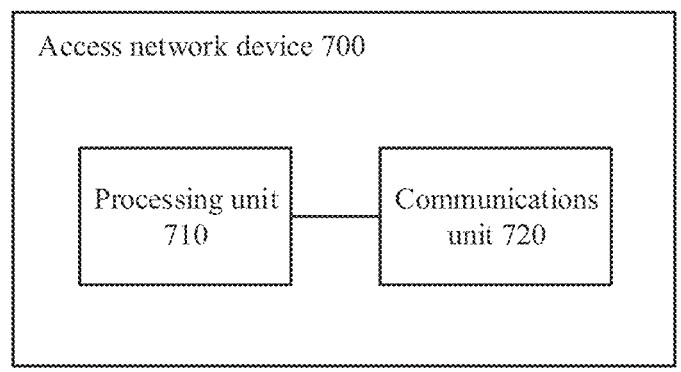
FIG. 7 is another schematic diagram of an access network device according to an embodiment of this application.

FIG. 7 is a schematic block diagram of an access network device 700 according to an embodiment of this application. It should be understood that the access network device 700 can perform the steps performed by the second access network device in FIG. 1 to FIG. 5. To avoid repetition, details are not described herein again. The access network device 700 includes a processing unit 710 and a communications unit 720.

Optionally, the processing unit 710 receives, by using the communications unit 720, information about a correspondence that is sent by a first access network device, where the correspondence is a correspondence between a session of a terminal device and a network slice; and the processing unit 710 determines a network slice for the session based on the information about the correspondence.

Optionally, the session includes a first session, the network slice includes a first network slice, and the first session corresponds to the first network slice; the correspondence includes a first relationship, and the first relationship is a correspondence between the first session and the first network slice; and that the processing unit 710 determines the network slice for the session based on the information about the correspondence includes: when the first network slice can provide a service for the first session in the access network device 700, the processing unit 710 determines the first network slice for the first session based on information about the first relationship.

Optionally, the processing unit 710 receives, by using the communications unit 720, information about a second relationship between the first session and a second network slice. The information about the second relationship may be used to instruct to remap the first session from the first network slice to at least one second network slice.

Optionally, the session includes a second session, the network slice includes at least two network slices, and the second session corresponds to the at least two network slices; the correspondence includes a third relationship, and the third relationship is a correspondence between the second session and the at least two network slices; and that the processing unit 710 determines the network slice for the session based on the information about the correspondence includes: the processing unit 710 determines, for the second session, one network slice from the at least two network slices based on information about the third relationship.

Optionally, the at least two network slices are arranged based on priorities, and that the processing unit 710 determines, for the second session, one network slice from the at least two network slices based on the information about the third relationship includes: the processing unit 710 determines, for the second session, one network slice from the at least two network slices based on the priorities and the information about the third relationship.

Figure 8:
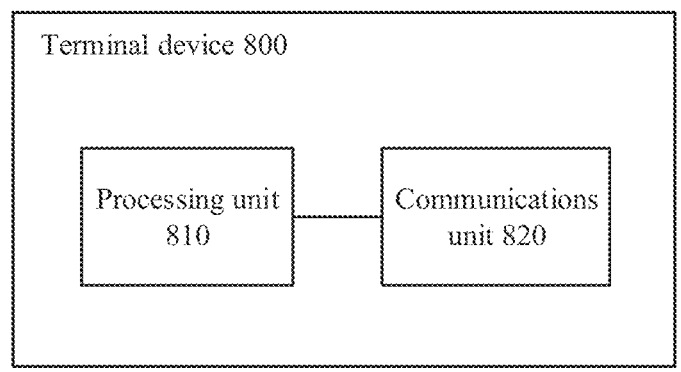
FIG. 8 is a schematic diagram of a terminal device according to an embodiment of this application.

FIG. 8 is a schematic block diagram of a terminal device 800 according to an embodiment of this application. It should be understood that the terminal device 800 can perform the steps performed by the terminal device in FIG. 1 to FIG. 5. To avoid repetition, details are not described herein again. The terminal device 800 includes a processing unit 810 and a communications unit 820.

The processing unit 810 obtains information about a correspondence, and the correspondence is a correspondence between a session of the terminal device 800 and a network slice. The processing unit 810 sends, by using the communications unit 820, the information about the correspondence to a first access network device.

Optionally, the session includes a first session, the network slice includes a first network slice, and the first session corresponds to the first network slice; and the correspondence includes a first relationship, and the first relationship is a correspondence between the first session and the first network slice.

Optionally, the processing unit 810 is further configured to send, by using the communications unit 820, information about a second relationship between the first session and a second network slice. The information about the second relationship may be used to instruct to remap the first session from the first network slice to at least one second network slice.

Optionally, the session includes a second session, the network slice includes at least two network slices, and the second session corresponds to the at least two network slices; and the correspondence includes a second relationship, and the second relationship is a correspondence between the second session and the at least two network slices.

Optionally, the processing unit 810 is further configured to arrange the at least two network slices based on priorities.

Optionally, that the processing unit 810 obtains the information about the correspondence includes: the processing unit 810 determines the correspondence based on a network slice selection policy NSSP.

Optionally, that the processing unit 810 obtains the information about the correspondence includes: the processing unit 810 receives, by using the communications unit 820, instruction information sent by the first access network device, where the instruction information is used to instruct the terminal device 800 to send the correspondence to the first access network device; and the processing unit 810 sends, by using the communications unit 820, the information about the correspondence to the first access network device.

Optionally, the instruction information is carried in radio resource control RRC signaling.

Optionally, the instruction information is further used to instruct the terminal device 800 to send, when a preset first condition is met, the correspondence to the first access network device.

Figure 9:
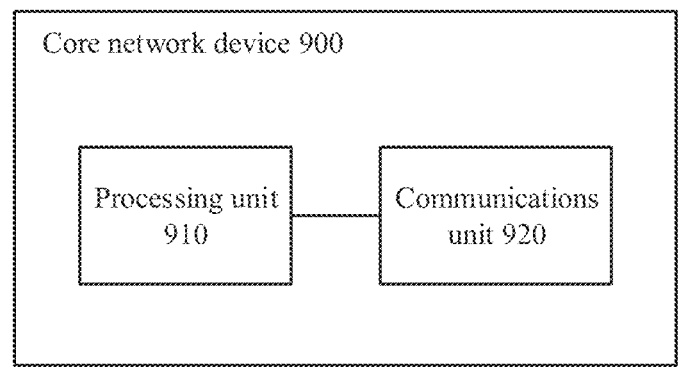
FIG. 9 is a schematic diagram of a core network device according to an embodiment of this application.

FIG. 9 is a schematic block diagram of a core network device 900 according to an embodiment of this application. It should be understood that the core network device 900 can perform the steps performed by the core network device in FIG. 1 to FIG. 5. To avoid repetition, details are not described herein again. The core network device 900 includes a processing unit 910 and a communications unit 920.

The processing unit 910 receives, by using the communications unit 920, information about a correspondence that is sent by a first access network device, and the correspondence is a correspondence between a session corresponding to a terminal device and a network slice; and the processing unit 910 determines, a network slice for the session of the terminal device based on the information about the correspondence; or the processing unit 910 sends the information about the correspondence to a second access network device.

Optionally, the information about the correspondence is used to instruct the second access network device to determine the network slice for the session of the terminal device.

Optionally, the session includes a first session, the network slice includes a first network slice, and the first session corresponds to the first network slice; and the correspondence includes a first relationship, and the first relationship is a correspondence between the first session and the first network slice.

Optionally, the processing unit 910 sends, by using the communications unit 920, information about a second relationship between the first session and a second network slice. The information about the second relationship may be used to instruct to remap the first session from the first network slice to at least one second network slice.

Optionally, the session includes a second session, the network slice includes at least two network slices, and the second session corresponds to the at least two network slices; and the correspondence includes a third relationship, and the third relationship is a correspondence between the second session and the at least two network slices.

Optionally, the at least two network slices are arranged based on priorities.

Figure 10:
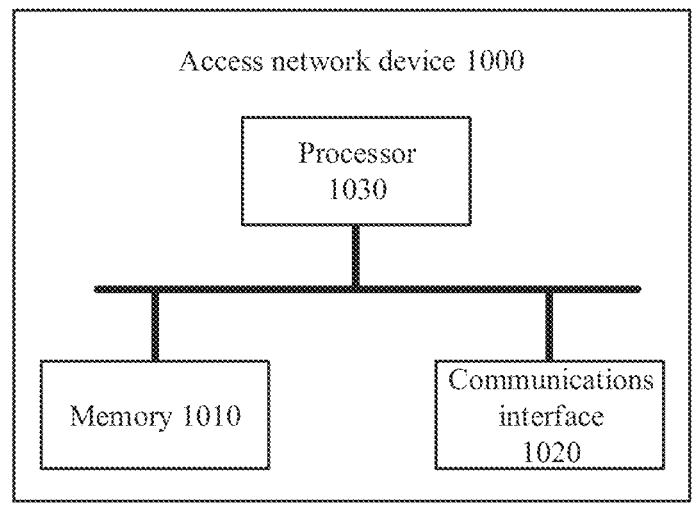
FIG. 10 is a schematic diagram of an access network device according to another embodiment of this application.

FIG. 10 is a schematic structural diagram of an access network device 100) according to an embodiment of this application. As shown in FIG. 10, the access network device 1000 includes one or more processors 1030, one or more memories 1010, and one or more communications interfaces 1020. The processor 1030 is configured to control the communications interface 1020 to receive and send a signal. The memory 1010 is configured to store a computer program. The processor 1030 is configured to: invoke the computer program from the memory 1010 and run the computer program, so that the access network device is enabled to perform a corresponding procedure and/or operation performed by the first access network device in the embodiments of the communication method in this application. For brevity, details are not described herein again.

It should be noted that the access network device 600 shown in FIG. 6 may be implemented by the access network device 1000 shown in FIG. 10. For example, the communications unit 620 may be implemented by the communications interface 1020 in FIG. 10, and the processing unit 610 may be implemented by the processor 1030.

Figure 11:
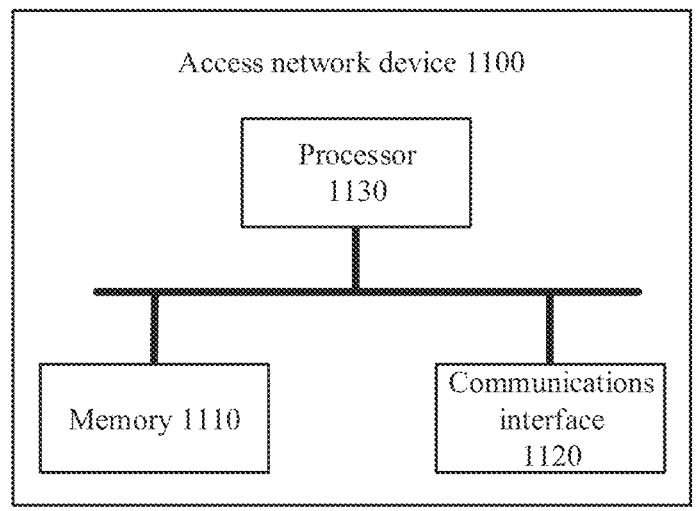
FIG. 11 is another schematic diagram of an access network device according to another embodiment of this application.

FIG. 11 is a schematic structural diagram of an access network device 1100 according to an embodiment of this application. As shown in FIG. 11, the access network device 1100 includes one or more processors 1130, one or more memories 1110, and one or more communications interfaces 1120. The processor 1130 is configured to control the communications interface 1120 to receive and send a signal. The memory 1110 is configured to store a computer program. The processor 1130 is configured to: invoke the computer program from the memory 1110 and run the computer program, so that the access network device is enabled to perform a corresponding procedure and/or operation performed by the second access network device in the embodiments of the communication methods in this application. For brevity, details are not described herein again.

It should be noted that the access network device 700 shown in FIG. 7 may be implemented by the access network device 1100 shown in FIG. 11. For example, the communications unit 720 may be implemented by the communications interface 1120 in FIG. 11, and the processing unit 710 may be implemented by the processor 1130.

Figure 12:
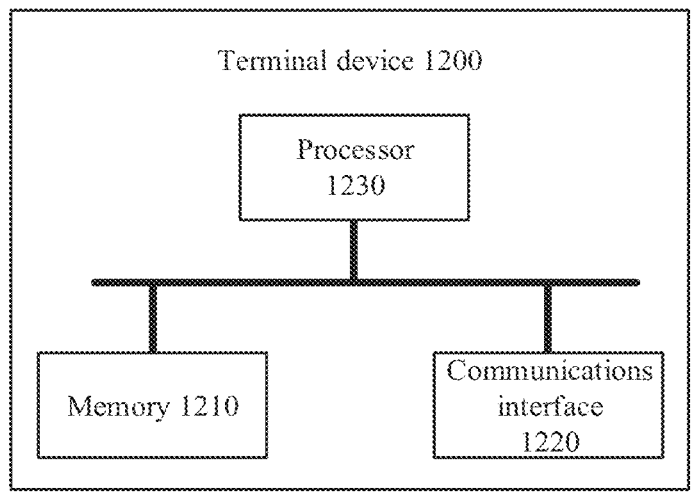
FIG. 12 is a schematic diagram of a terminal device according to another embodiment of this application.

FIG. 12 is a schematic structural diagram of a terminal device 1200 according to an embodiment of this application. As shown in FIG. 12, the terminal device 1200 includes one or more processors 1230, one or more memories 1210, and one or more communications interfaces 1220. The processor 1230 is configured to control the communications interface 1220 to receive and send a signal. The memory 1210 is configured to store a computer program. The processor 1230 is configured to: invoke the computer program from the memory 1210 and run the computer program, so that the terminal device is enabled to perform a corresponding procedure and/or operation performed by the terminal device in the embodiments of the communication method in this application. For brevity, details are not described herein again.

It should be noted that the terminal device 800 shown in FIG. 8 may be implemented by the terminal device 1200 shown in FIG. 12. For example, the communications unit 820 may be implemented by the communications interface 1220 in FIG. 12, and the processing unit 810 may be implemented by the processor 1230.

Figure 13:
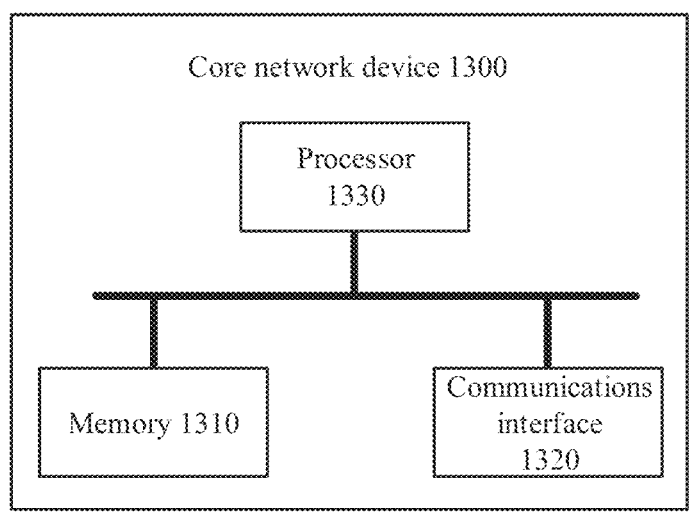
FIG. 13 is a schematic diagram of a core network device according to another embodiment of this application.

FIG. 13 is a schematic structural diagram of a core network device 1300 according to an embodiment of this application. As shown in FIG. 13, the core network device 1300 includes one or more processors 1330, one or more memories 1310, and one or more communications interfaces 1320. The processor 1330 is configured to control the communications interface 1320 to receive and send a signal. The memory 1310 is configured to store a computer program. The processor 1330 is configured to: invoke the computer program from the memory 1310 and run the computer program, so that the core network device is enabled to perform a corresponding procedure and/or operation performed by the core network device in the embodiments of the communication method in this application. For brevity, details are not described herein again.

It should be noted that the core network device 900 shown in FIG. 9 may be implemented by the core network device 1300 shown in FIG. 13. For example, the communications unit 920 may be implemented by the communications interface 1320 in FIG. 13, and the processing unit 910 may be implemented by the processor 1330.

A person of ordinary skill in the art may be aware that, in combination with units and algorithm steps of the examples described in the embodiments disclosed in this specification, this application may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method comprising:
    forwarding, by a first access network device to a core network device, a non-access stratum (NAS) message received from a terminal device, wherein the NAS message comprises information received from a terminal device about a correspondence between a packet data unit (PDU) session of the terminal device and a network slice;
    receiving, by the first access network device from the core network device, an NG application protocol (NGAP) message that comprises the information and a maximum quantity of accessible network slices of the terminal device;
    storing, by the first access network device, the information; and
    sending, by the first access network device, the information to a second access network device.

2. The communication method according to claim 1, further comprising:
    sending, by the first access network device and to the terminal device, one or more instructions that instruct the terminal device to send the correspondence to the first access network device; and
    receiving, by the first access network device and from the terminal device, the NAS message in response to the one or more instructions.

3. The communication method according to claim 2, wherein the one or more instructions further includes a preset condition and the terminal device is instructed to send the NAS message in response to the preset condition being satisfied.

4. A communication method comprising:
    obtaining, by a terminal device, information about a correspondence between a packet data unit (PDU) session of the terminal device and a network slice; and
    sending, by the terminal device, a non-access stratum (NAS) message that comprises the information to first access network device to be forwarded to a core network device for processing and sent to a second access network device, wherein the core network device sends the information in an NG application protocol (NGAP) message after processing, for the first access network device to send to the second access network device, wherein the NGAP message comprises the information and a maximum quantity of accessible network slices of the terminal device.

5. The communication method according to claim 4, wherein obtaining the information about the correspondence comprises:
    receiving, by the terminal device and from the first access network device, one or more instructions instruct the terminal device to send the correspondence to the first access network device; and
    sending, by the terminal device and to the first access network device, the information about the correspondence.

6. An access network device, comprising:
    a communications interface;
    at least one processor coupled to the communications interface; and
    a memory coupled to the at least one processor and storing programming instructions for execution by the at least one processor, the programming instructions instruct the at least one processor to:
    forward, by using the communications interface, a non-access stratum (NAS) message received from a terminal device, wherein the NAS message comprises information received from a terminal device about a correspondence between a packet data unit (PDU) session of the terminal device and a network slice;
    receive, by using the communications interface from a core network device, an NG application protocol (NGAP) message that comprises the information and a maximum quantity of accessible network slices of the terminal device;
    store the information; and
    send, by using the communications interface, the information to a second access network device.

7. The access network device according to claim 6, the programming instructions further instruct the at least one processor to:
    send, by using the communications interface, one or more instructions to the terminal device, wherein the one or more instructions instruct the terminal device to send the correspondence to the access network device; and
    receive, by using the communications interface, the NAS message in response to the one or more instructions.

8. The access network device according to claim 7, wherein the one or more instructions further includes a preset condition and the terminal device is instructed to send the NAS message in response to the preset condition being satisfied.

9. The access network device according to claim 6, wherein the network slice comprises a first network slice and a second network slice, the correspondence is a first correspondence between the PDU session and the first network slice, and the information further comprises a second correspondence between the PDU session and the second network slice.

10. A terminal device, wherein the terminal device comprises:

a communications interface;

at least one processor coupled to the communications interface; and a memory coupled to the at least one processor and storing programming instructions for execution by the at least one processor, the programming instructions instruct the at least one processor to:

obtain information about a correspondence between a packet data unit (PDU) session of the terminal device and a network slice; and send, through the communications interface, a non-access stratum (NAS) message that comprises the information about the correspondence to first access network device to be forwarded to a core network device for processing and sent to a second access network device, wherein the core network device sends the information in an NG application protocol (NGAP) message after processing, for the first access network device to send to the second access network device, wherein the NGAP message comprises the information and a maximum quantity of accessible network slices of the terminal device.

11. The terminal device according to claim 10, wherein obtain the information about the correspondence comprises:

receiving one or more instructions sent by the first access network device, wherein the one or more instructions instruct the terminal device to send the correspondence to the first access network device; and sending the information about the correspondence to the first access network device.

* * * * *